(12) United States Patent
Kim et al.

(10) Patent No.: US 11,123,950 B2
(45) Date of Patent: Sep. 21, 2021

(54) ARTIFICIAL LEATHER SHEET AND METHOD FOR MANUFACTURING THEREOF

(71) Applicant: KOLON GLOTECH, INC., Seoul (KR)

(72) Inventors: Minho Kim, Seoul (KR); Junsoo Kim, Suwon (KR)

(73) Assignee: Kolon Giotech, Inc., Seoul (KR)

( * ) Notice: Subject to any disclaimer, the term of this patent is extended or adjusted under 35 U.S.C. 154(b) by 0 days.

(21) Appl. No.: 16/017,898

(22) Filed: Jun. 25, 2018

(65) Prior Publication Data
US 2019/0255806 A1    Aug. 22, 2019

(30) Foreign Application Priority Data
Feb. 21, 2018    (KR) .................. 10-2018-0020772

(51) Int. Cl.
| | | |
|---|---|---|
| B32B 5/24 | (2006.01) | |
| B32B 27/06 | (2006.01) | |
| B32B 27/30 | (2006.01) | |
| B32B 37/18 | (2006.01) | |
| B32B 38/00 | (2006.01) | |
| B32B 38/06 | (2006.01) | |
| B32B 37/02 | (2006.01) | |
| B32B 33/00 | (2006.01) | |
| B32B 37/24 | (2006.01) | |

(52) U.S. Cl.
CPC ............ *B32B 5/245* (2013.01); *B32B 27/065* (2013.01); *B32B 27/304* (2013.01); *B32B 33/00* (2013.01); *B32B 37/02* (2013.01); *B32B 37/182* (2013.01); *B32B 38/06* (2013.01); *B32B 38/145* (2013.01); *B32B 2037/243* (2013.01); *B32B 2038/0084* (2013.01); *B32B 2255/10* (2013.01); *B32B 2255/26* (2013.01); *B32B 2262/0276* (2013.01); *B32B 2262/04* (2013.01); *B32B 2262/062* (2013.01); *B32B 2266/0235* (2013.01); *B32B 2305/18* (2013.01); *B32B 2317/10* (2013.01)

(58) Field of Classification Search
None
See application file for complete search history.

(56) References Cited

U.S. PATENT DOCUMENTS

| | | | | |
|---|---|---|---|---|
| 4,906,516 A | * | 3/1990 | Okamura ................. | B32B 5/22 428/215 |
| 2005/0049341 A1 | * | 3/2005 | Grass ..................... | C08J 9/0014 524/306 |
| 2012/0258303 A1 | * | 10/2012 | Buhring .................. | B32B 5/18 428/318.6 |

* cited by examiner

*Primary Examiner* — Chinessa T. Golden

(57) ABSTRACT

An artificial leather sheet includes a substrate layer, a foaming layer formed on upper surfaces of the substrate layer, a surface layer formed on upper surfaces of the foaming layer, and a surface treatment layer formed on upper surfaces of the surface layer. The foaming layer includes a polyvinyl chloride resin, a plasticizer, a foaming agent, and a stabilizer. The surface layer includes the polyvinyl chloride resin, the plasticizer, and the stabilizer. The plasticizer is bis-(2-propylheptyl) phthalate (DPHP) and di-isononyl adipate (DINA).

9 Claims, 7 Drawing Sheets

ARTIFICIAL LEATHER SHEET AND METHOD FOR MANUFACTURING THEREOF

TECHNICAL FIELD

The present invention relates to an artificial leather sheet and a method for manufacturing thereof. Specifically, the present invention relates to an artificial leather sheet having excellent cold resistance, softness, tensile elongation, and stiffness as well as being nontoxic and human friendly, and a method for manufacturing thereof.

BACKGROUND ART

Generally, conventional artificial leathers have been manufactured using suspected environmental hormones being phthalate-based plasticizers to be not human friendly. Typical examples of the plasticizers are Di(2-ethylhexyl) phthalate (DEHP), Dibutyl phthalate (DBP), Benzyl butyl phthalate (BBP), Di-isononyl phthalate (DINP), and Di-normal-octyl phthalate (DNOP). Specifically, it was confirmed that the above-mentioned three major regulatory plasticizers (DEHP, DBP, and BBP) were carcinogenic, modification toxic, and reproductive toxic. As a result, European Union have prohibited product and import products for children such as toys using three major regulatory plasticizers. Residual DINP and DNOP were prohibited in products for children such as toys possible to be into mouth and designated as endocrine disruptor to be scheduled to prohibit product and import them since 2018.

In addition, plasticizers used in manufacturing conventional foaming artificial leathers become thick at a low temperature (below −30° C.) so that there are problems in that surfaces of the artificial leathers are easily come off by outside minor impact and cracks occur minutely. Also, artificial leather with low plasticizing rate have low softness, and stiffness and tensile elongation are lowed and Total Volatile Organic Compound (TVOC) is detected.

Accordingly, the present invention provides an artificial leather sheet having excellent cold resistance, softness, tensile elongation, and stiffness as well as being nontoxic and human friendly, and a method for manufacturing thereof by applying non-phthalate plasticizer with excellent plasticizing rate.

DISCLOSURE

Technical Problem

It is therefore an object of the present invention to provide an artificial leather sheet having excellent cold resistance, softness, tensile elongation, and stiffness as well as being nontoxic and human friendly, and a method for manufacturing thereof.

Technical Solution

Hereinafter, the present invention will be described in detail with reference to the drawings. In describing the present invention, detailed descriptions related to publicly known functions or configurations will be omitted in order not to obscure the gist of the present invention.

An artificial leather sheet of the present invention comprising a substrate layer, a foaming layer formed on upper surfaces of the substrate layer, a surface layer formed on upper surfaces of the foaming layer, and a surface treatment layer formed on upper surfaces of the surface layer. In this case, the foaming layer comprises a polyvinyl chloride resin, a plasticizer, a foaming agent, and a stabilizer. The surface layer comprises the polyvinyl chloride resin, the plasticizer, and the stabilizer. The plasticizer is bis-(2-propylheptyl) phthalate (DPHP) and di-isononyl adipate (DINA).

Figure 1:
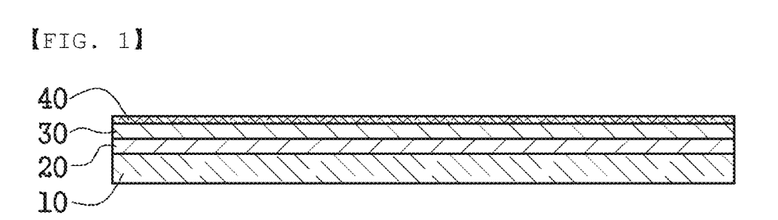
FIG. 1 is a cross-sectional view of an artificial leather sheet according to an embodiment of the present invention.

FIG. 1 is a cross-sectional view of an according to an embodiment of the present invention. As shown in FIG. 1, the artificial leather sheet of the present invention comprises a substrate layer 10, a foaming layer 20 formed on upper surfaces of the substrate layer, a surface layer formed on upper surfaces of the foaming layer, and a surface treatment layer 40 formed on upper surfaces of the surface layer.

The substrate layer 10 is a base fabric being an element of the artificial leather sheet and includes a fabric weaved by one or more yarn selected from the group consisting of cotton, rayon, and polyester yarn as well as a fabric weaved by yarns used in a conventional calendaring manufacturing and not limited thereto. In order to prevent harmful materials such as formaldehyde on the substrate layer, harmful materials possibly occurring in weaving or dyeing are prevented by managing raw materials of fabrics.

The foaming layer 20 is an element of the artificial leather sheet and performs a function to assign cubic effect, softness, and cushion effect. Lower surfaces of the foaming layer or a film for the foaming layer are laminated with the substrate layer, and upper surfaces of the foaming layer or a film for the foaming layer are laminated with a the surface layer described later. Lower surfaces of the foaming layer or the film for the foaming layer and the substrate layer or upper surfaces of the foaming layer or the film for the foaming layer and the surface layer are laminated by calendering process. As used herein, the term "calendering process" is a kind of plastic molding that manufactures film-shaped or sheet-shaped molded products by inserting thermoplastic resins between two heated rolls. In the calendering process, plastics are covered on surfaces of fabrics, papers, and so forth.

The foaming layer or the film for the foaming layer includes a polyvinyl chloride resin, a plasticizer, a foaming agent, and a stabilizer. Concretely, the film for the foaming layer forms a polyvinyl-chloride based film for the foaming layer with a composition for the foaming layer including the polyvinyl chloride resin, the plasticizer, the foaming agent, and the stabilizer through the calendering process. A predetermined heat and pressure to the polyvinyl-chloride based film for the foaming layer are applied to form the foaming layer. More concretely, a multilayer body laminated through a calendering process and where the substrate layer, the surface layer, and the first surface treatment layer are sequentially stacked is foamed at a temperature ranging from 170° C. to 250° C. for 60 to 300 seconds to form the foaming layer.

The foaming layer has a thickness ranging from 0.1 mm to 0.5 mm. If the thickness of the foaming layer is less than 0.1 mm, the cushion feeling of the artificial leather may be reduced due to thin thickness and fabric patterns of the substrate are exposed to surfaces of products. In contrast, if the thickness of the foaming layer is greater than 0.5 mm, bending wrinkles occur on surfaces of products.

The foaming layer or the film for the foaming layer includes 70 parts by weight to 95 parts by weight of the plasticizer, 0.5 parts by weight to 2.5 part by weight of the foaming agent, and 1 part by weight to 5 parts by weight of the stabilizer with respect to 100 parts by weight of the polyvinyl chloride resin.

The polyvinyl chloride (PVC) resin of the foaming layer or the film for the foaming layer has polymerization degree of 900 to 1,400, in concrete, 1,000 to 1,300. If the polymerization degree of the polyvinyl chloride resin is less than 900, excessive flowability occurs so that the film is not smoothly molded. If the polymerization degree of the polyvinyl chloride resin is greater than 1,400, exceptional loads are borne to a machine in molding the film.

The foaming agent used in forming the foaming layer 20 is Azo-based polymers such as Azo-butane copolymer, Azo di-carbon amide (ADCA), or Azo bis-form amide and Hydrazide-based polymers such as Oxy benzene sulfonyl hydrazide (OBSH), p-toluene sulfonyl hydrazide. The foaming agent is Azo di-carbon amide, and it is possible to suppress volatile substances by removing additional factors causing gas by heat and pressure and exhausting gas occurred to the maximum through a full foaming process.

The plasticizer of the foaming layer or the film for the foaming layer is bis-(2-propylheptyl) phthalate (DPHP) and di-isononyl adipate (DINA). The weight ratio of the DINA and DPHP is 1:1 to 1:19. If DPHP and DINA are employed as the plasticizer, it is possible to dramatically improve the problems in that artificial leathers become thick at a low temperature (below −30° C.) so that there are problems in that surfaces of the artificial leathers are easily come off by outside minor impact and cracks occur minutely. The artificial leather of the present invention has excellent softness, tensile elongation, and stiffness as well as being nontoxic and human friendly.

The stabilizer is a low-temperature thermostabilizer, a foaming stabilizer, and thermostabilizer. The thermostabilizer contains ingredient capable of preventing quality degradation of the polyvinyl-chloride based film in processing it or from the heat. The ingredient of the thermostabilizer is various well-known thermostabilizer such as a lead-based thermostabilizer, an organic-tin based thermostabilizer, or a complexed-based thermostabilizer. Considering human affinity, it is preferable not to include lead. For example, typical examples of the thermostabilizer is stearate-acid barium, stearate-acid zinc, stearate-acid magnesium, stearate-acid calcium, mercaptide-based stabilizer, carboxylate-based stabilizer, Ba—Zn based organic composite, Ca—Zn based organic composite, and so forth. The thermostabilizer of the present invention is a Ca—Zn based or Ba—Zn based stabilizer as a powder stabilizer. A conventional stabilizer used to prevent aging and decomposition of the polyvinyl chloride (PVC) is liquid type and formed of volatility and exhaustion organic compounds. In the present invention, a stabilizer with high purity is applied to prevent volatility and exhaustion.

The low-temperature thermostabilizer is added to prevent discoloration because polyvinyl chloride based film is weak to heat. The low-temperature thermostabilizer performs a function to prevent discoloration at a temperature ranging from 80° C. to 100° C. The low-temperature thermostabilizer includes butyl glycol and sodium perchlorate.

The foaming stabilizer promotes degradation of the foaming agent to improve foaming effect and can be selected depending on a kind of the foaming agent. For instance, if the Azodi carbon amide (ADCA) is used as the foaming agent, the foaming stabilizer can be at least one selected from the group consisting of adipic acid hydrazide, hydroxide hydrazide, zinc oxide, lead, urea, and stearic acid zinc.

In addition, the foaming layer or the film for the foaming layer further includes a processing aid, a flame retardant, or a pigment.

The processing aid improves processing to have smooth surface, excellent gloss, or conformal foam cell structure in forming composition for the foaming layer into a film. The processing aid is not limited within the field of polyvinyl chloride.

The flame retardant is at least one from the group consisting of phosphorus based flame retardant, metallic hydrate based flame retardant, halogen based flame retardant, non-halogen based flame retardant and a mixture thereof.

The pigment is not dissolvable in water or most organic solvent and powder-type coloring agent. The pigment is classified into organic pigment and inorganic agent. Various kinds of the pigments can be used according to the object and target material.

The surface layer 30 is an element of the artificial leather sheet and corresponds to a skin of the artificial leather sheet. Lower surfaces of the surface layer is laminated with the film for foaming layer through calendering process.

The surface layer or the film for foaming layer includes polyvinyl chloride (PVC), plasticizer, and stabilizer.

Concretely, the surface layer forms the polyvinyl-chloride based film with a composition for the surface layer including the polyvinyl chloride (PVC), plasticizer, and stabilizer into a polyvinyl chloride based film through a calendering process. The surface layer or the film for the surface layer 70 parts by weight to 95 parts by weight of the plasticizer and 1 part by weight to 7 parts by weight of the stabilizer with respect to 100 parts by weight of the polyvinyl chloride resin. The surface layer or the film for the surface layer includes a processing aid, a UV absorber, a flame retardant, or a pigment.

The polyvinyl chloride (PVC) resin of the surface layer or the film for the surface layer has 900 to 1,400 polymerization degree, in concrete, 1,000 to 1,300. If the polymerization degree of the polyvinyl chloride resin is less than 900, excessive flowability occurs so that the film is not smoothly molded. If the polymerization degree of the polyvinyl chloride resin is greater than 1,400, exceptional loads are borne to a machine in molding the film.

The surface layer 30 has a thickness ranging from 0.1 mm to 0.5 mm. If the thickness of the surface layer 30 is less than 0.1 mm, it is difficult to secure surface roughness. In contrast, if the thickness of the surface layer is greater than 0.5 mm, the cushion feeling of the artificial leather may be reduced due to thin thickness and the adhesion between the surface layer and the foaming layer may be reduced.

The plasticizer of the surface layer or the film for the surface layer is bis-(2-propylheptyl) phthalate (DPHP) and di-isononyl adipate (DINA). The weight ratio of the DINA and DPHP is 1:1 to 1:19. If DPHP and DINA are employed as the plasticizer, it is possible to dramatically improve the problems in that artificial leathers become thick at a low temperature (below −30° C.) so that there are problems in that surfaces of the artificial leathers are easily come off by outside minor impact and cracks occur minutely. The artificial leather of the present invention has excellent softness, tensile elongation, and stiffness as well as being nontoxic and human friendly.

The stabilizer, processing aid, flame retardant, and pigment included in the surface layer or the film for the surface layer are the same as those of the foaming layer or the film for the foaming layer. Therefore, to avoid descriptive duplication, the detailed description for the same periods will be omitted.

The UV absorber is selected from various well-known materials such as a benzo triazole type UV absorber and a triazine type UV absorber.

The lamination between a base fabric being the substrate layer and the film for the foaming layer and between the film for the foaming layer and the film for the surface layer are sequentially stacked at a temperature ranging from 60° C. to 200° C., more concretely, 160° C. to 190° C.

The surface treatment layer 40 is an element of the artificial leather sheet of the present invention and prevents transmission of the plasticizer, protects the surface layer from surface touch and surface contamination, and impart various properties such as antifouling and gloss on surfaces of the artificial leather sheet. The surface treatment layer may be formed of a plurality of the surface treatment layers. The plurality of the surface treatment layers include a first surface treatment layer, which is formed using a composition for the surface treatment layer including acrylic based resin or urethane based resin by gravure printing. The gravure printing is performed by a conventional gravure printing machine. The first surface treatment layer performs a function to prevent transmission of the plasticizer that is used in the above-mentioned film for the foaming layer and the surface layer. Additionally, the plurality of the surface treatment layers include a second surface treatment layer or a third surface layer, which are formed using a composition for the surface treatment layer including acrylic based resin or urethane based resin by gravure printing.

A method for manufacturing an artificial leather sheet comprises forming a substrate layer, laminating a film for a foaming layer for forming the foaming layer on upper surfaces of the substrate layer, laminating a film for a surface layer on upper surfaces of the film for the foaming layer to form the surface layer and coating a composition for a surface treatment layer on upper surfaces of the surface layer to form a plurality of the surface treatment layer. In this case, the film for the foaming layer comprises a polyvinyl chloride resin, a plasticizer, a foaming agent, and a stabilizer. The film for the surface layer comprises the polyvinyl chloride resin, the plasticizer, and the stabilizer. The plasticizer is bis-(2-propylheptyl) phthalate (DPHP) and di-isononyl adipate (DINA).

Figure 2:
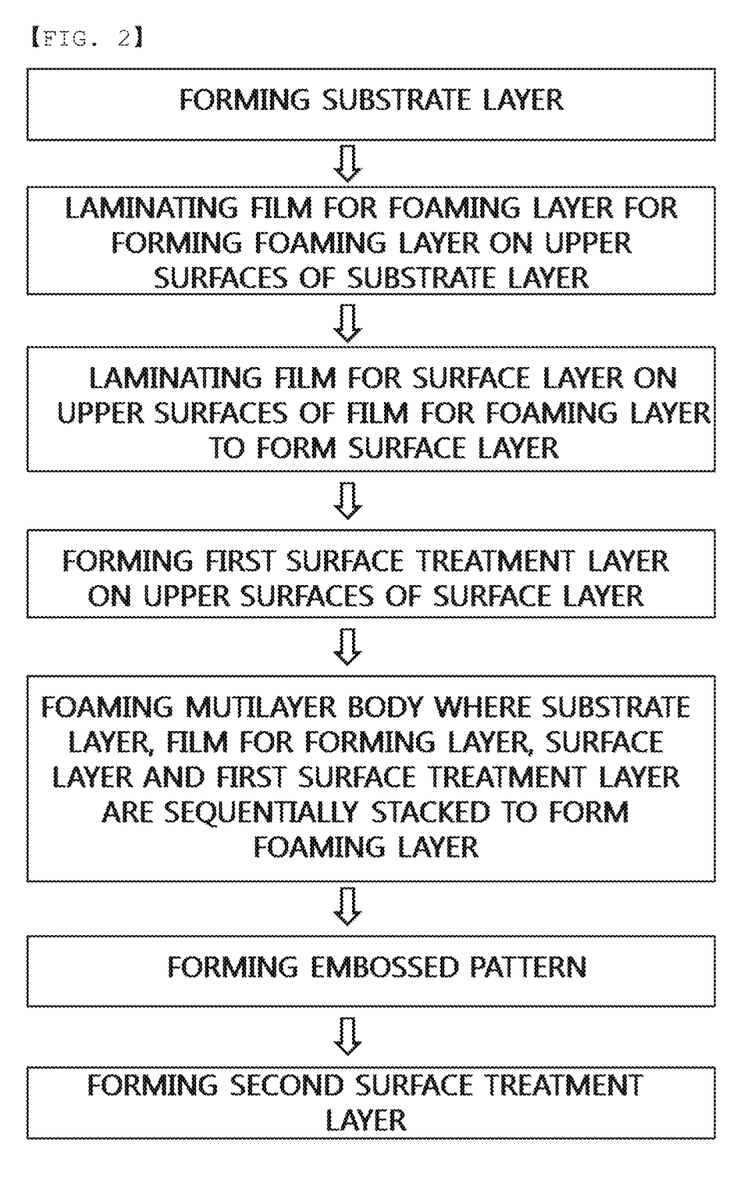
FIG. 2 schematically shows a manufacturing process of an artificial leather sheet according to an embodiment of the present invention.

FIG. 2 schematically shows a manufacturing process of an artificial leather sheet according to an embodiment of the present invention. In the present invention, a substrate layer, a foaming layer, a film for the foaming layer, a surface layer, a film for the surface layer, and a plurality of the surface layers are the same as the aforementioned.

Additionally, the substrate layer is a base fabric as an element of the artificial leather sheet and includes at least one or more from the group consisting of a cotton yarn, a rayon yarn, and a polyester yarn.

The foaming layer forms a film for the foaming layer, concretely, a polyvinyl-chloride based film for the foaming layer with a composition for the foaming layer including a polyvinyl chloride resin, a plasticizer, a foaming agent, and a stabilizer through a calendering process. The film for the foaming layer is laminated with the foaming layer on upper surfaces of the substrate layer through the calendering process.

The surface layer forms the polyvinyl-chloride based film with a composition for the surface layer including the polyvinyl chloride (PVC), plasticizer, and stabilizer into a polyvinyl chloride based film through a calendering process and laminated with upper surfaces of the film for the foaming layer.

The lamination between the base fabric being the substrate layer and the film for the foaming layer and between the film for the foaming layer and the film for the surface layer are sequentially stacked at a temperature ranging from 60° C. to 200° C., more concretely, 160° C. to 190° C. through a calendering process.

The surface treatment layer includes a first surface treatment layer using a urethane-based resin or an acrylic-based resin by gravure printing.

In addition, the method for manufacturing an artificial leather sheet further comprises foaming a multilayer body where the substrate layer, the film for the foaming layer, the surface layer, and the first surface treatment layer are sequentially stacked at a temperature ranging from 170° C. to 250° C. for 60 to 300 seconds below foaming magnification of 500% to form the foaming layer, forming an embossed pattern after forming the foaming layer, and forming a second surface treatment layer using a composition for the surface treatment layer including the acrylic-based resin or the urethane-based resin by the gravure printing. Also, the method further comprises forming a third surface treatment layer using a composition for the surface treatment layer including the acrylic-based resin or the urethane-based resin by the gravure printing.

Accordingly, the artificial leather sheet by the above-mentioned manufacturing method includes the substrate layer, the foaming layer, a first surface treatment layer, an embossed pattern layer, a second surface treatment layer, and a third surface treatment layer.

A method for manufacturing an artificial leather sheet comprises forming a substrate layer, laminating a film for a foaming layer for forming the foaming layer on upper surfaces of the substrate layer, laminating a film for a surface layer on upper surfaces of the film for the foaming layer to form the surface layer, forming a first surface treatment layer using a composition for the surface treatment layer including an acrylic-based resin or an urethane-based resin by a gravure printing on upper surfaces of the surface layer, foaming a multilayer body where the substrate layer, the film for the foaming layer, the surface layer, and the first surface treatment layer are sequentially stacked at a temperature ranging from 170° C. to 250° C. for 60 to 300 seconds to form the foaming layer, forming an embossed pattern after forming the foaming layer, and forming a second surface treatment layer using a composition for the surface treatment layer including the acrylic-based resin or the urethane-based resin by the gravure printing. In this case, the substrate layer includes at least one or more from the group consisting of a cotton yarn, a rayon yarn, and a polyester yarn. The film for the foaming layer includes 70 parts by weight to 95 parts by weight of the plasticizer, 0.5 parts by weight to 2.5 part by weight of the foaming agent, and 1 parts by weight to 5 parts by weight of the stabilizer with respect to 100 parts by weight of the polyvinyl chloride resin. The film for the surface layer includes 70 parts by weight to 95 parts by weight of the plasticizer and 1 part by weight to 7 parts by weight of the stabilizer with respect to 100 parts by weight of the polyvinyl chloride resin. The plasticizer is bis-(2-propylheptyl) phthalate (DPHP) and di-isononyl adipate (DINA), the foaming agent is Azo Di Carbon Amide, and the weight ratio of the DINA and DPHP is 1:1 to 1:19, and the foaming layer has a thickness ranging from 0.1 mm to 0.5 mm.

Advantageous Effects

According to the present invention, the artificial leather sheet comprises a substrate layer, a foaming layer formed on upper surfaces of the substrate layer, a surface layer formed on upper surfaces of the foaming layer, and a surface treatment layer formed on upper surfaces of the surface layer.

The artificial leather sheet according to the present invention is human-friendly because it uses bis-(2-propylheptyl) phthalate (DPHP) and di-isononyl adipate (DINA) being nontoxic as a plasticizer in molding a polyvinyl chloride based film for the foaming layer and a polyvinyl chloride based film for the surface layer. Also, the surfaces of the artificial leather are not take off due to minor impact and minute cracks do not occur below −40° C. The artificial leather sheet has excellent softness, stiffness, and tensile elongation and has low Total Volatile Organic Compound (TVOC) by applying eco-friendly plasticizer with excellent plasticizing rate. And, 15 kinds of controlled phthalate-based plasticizer being suspected environmental hormones are excluded, and any harmful materials are not detected. As a result, the artificial leather sheet of the present invention is variously applicable in the field of kids/baby goods, toys, tight containers, packing materials, medical materials and so forth. All such changes, modifications, variations and other uses and applications which do not depart from the spirit and scope of the invention are deemed to be covered by the invention which is limited only by the claims which follow.

DESCRIPTION OF DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

BEST MODE

Hereinafter, the present invention will be described in more detail with reference to embodiments such that those having ordinary knowledge in the field to which the present invention pertains can easily implement the present invention. However, the present invention can be implemented in various forms and is not limited to embodiments described herein.

1. Manufacturing Artificial Leather Sheet

Example 1

Di-isononyl adipate (DINA) of 4.2. kg and bis-(2-propylheptyl) phthalate (DPHP) of 79.8 kg, a processing aid of 2 kg, a foaming stabilizer of 1.1 kg, a thermostabilizer of 2 kg, a foaming agent 1.5 kg and a flame retardant of 10 kg were added and mixed to a polyvinyl chloride resin of 100 kg having polymerization degree of 1,300 to form a composition for a foaming layer where a weight ratio of DINA and DPHP is 1:19.

Di-isononyl adipate (DINA) of 4.2. kg and bis-(2-propylheptyl) phthalate (DPHP) of 79.8 kg, a processing aid of 3 kg, a thermostabilizer of 4 kg, an UV absorber of 0.3 kg, and a flame retardant of 1.5 kg were added and mixed to a polyvinyl chloride resin of 100 kg having polymerization degree of 1,300 to form a composition for a surface layer where a weight ratio of DINA and DPHP is 1:19.

After that, the composition for the foaming layer was formed to a film for the foaming layer having a thickness of 0.3 mm by a calendering process. Then, the film for the foaming layer was laminated with upper surfaces of a substrate layer formed of a H/knit base fabric made of polyester to form a first multilayer body comprised of the substrate layer and the film for the foaming layer. During the calendering process for forming the first multilayer body, a temperature of a roll was 170±5° C. and a fabric width is 25±2 m/min. Also, the composition for the surface layer was formed to a film for the surface layer having a thickness of 0.3 mm by the calendering process and laminated with the upper surfaces of the film for the foaming layer of the first multilayer body, thereby forming a second multilayer body in which the substrate layer, the film for the foaming layer, and the surface layer were sequentially stacked. During the calendering process for forming the second multilayer body, a temperature of a roll was 170±5° C. and a fabric width is 30±2 m/min.

Then, an acrylic based composition for the surface treatment layer was coated on upper surfaces of the surface layer of the second multilayer body and dried at a temperature of 100° C. for 1 minute to form a first surface treatment layer by a gravure printing, thereby a third multilayer body in which the substrate layer, the film for the foaming layer, the surface layer, and the first surface treatment layer were sequentially stacked.

The third multilayer body was foamed at a temperature of 170° C. to 230° C. for 90 seconds to form the foaming layer and an embossed pattern. After forming a second surface treatment layer by a gravure printing at a temperature of 100° C. for 1 minute using the acrylic based composition for the surface treatment layer, a third surface treatment layer was formed by a gravure printing at a temperature of 100° C. for 1 minute using an urethane based composition for a surface treatment layer, and thereby manufacturing a PVC foaming artificial leather sheet, which was comprised of the substrate layer, foaming layer, surface layer, the first surface treatment layer, embossed pattern layer, second surface treatment layer, and third surface treatment layer.

Example 2

A composition for a foaming layer was manufactured in the same manner as in Example 1, except that a weight ratio of DINA and DPHP was 1:15 using DINA of 5.25 kg and DPHP of 78.75 kg.

A composition for a surface layer was manufactured in the same manner as in Example 1, except that a weight ratio of DINA and DPHP was 1:15 using DINA of 5.25 kg and DPHP of 78.75 kg.

As mentioned above, a PVC foaming artificial leather sheet was manufactured in the same manner as in Example 1, except that DINA and DPHP being a component of the composition for the foaming layer and the composition for the surface layer had different ratio.

Example 3

A composition for a foaming layer was manufactured in the same manner as in Example 1, except that a weight ratio of DINA and DPHP was 1:10 using DINA of 7.64 kg and DPHP of 76.36 kg.

A composition for a surface layer was manufactured in the same manner as in Example 1, except that a weight ratio of DINA and DPHP was 1:10 using DINA of 7.64 kg and DPHP of 76.36 kg.

As mentioned above, a PVC foaming artificial leather sheet was manufactured in the same manner as in Example 1, except that DINA and DPHP being a component of the composition for the foaming layer and the composition for the surface layer had different ratio.

Example 4

A composition for a foaming layer was manufactured in the same manner as in Example 1, except that a weight ratio of DINA and DPHP was 1:5 using DINA of 14 kg and DPHP of 70 kg.

A composition for a surface layer was manufactured in the same manner as in Example 1, except that a weight ratio of DINA and DPHP was 1:5 using DINA of 14 kg and DPHP of 70 kg.

As mentioned above, a PVC foaming artificial leather sheet was manufactured in the same manner as in Example 1, except that DINA and DPHP being a component of the composition for the foaming layer and the composition for the surface layer had different ratio.

Example 5

A composition for a foaming layer was manufactured in the same manner as in Example 1, except that a weight ratio of DINA and DPHP was 1:1 using DINA of 42 kg and DPHP of 42 kg.

A composition for a surface layer was manufactured in the same manner as in Example 1, except that a weight ratio of DINA and DPHP was 1:1 using DINA of 42 kg and DPHP of 42 kg.

As mentioned above, a PVC foaming artificial leather sheet was manufactured in the same manner as in Example 1, except that DINA and DPHP being a component of the composition for the foaming layer and the composition for the surface layer had different ratio.

Comparative Example 1

A composition for a foaming layer was manufactured in the same manner as in Example 1, except that DPHP of 84 kg was used as a plasticizer.

A composition for a surface layer was manufactured in the same manner as in Example 1, except that DIDP of 84 kg was used as a plasticizer.

As mentioned above, a PVC foaming artificial leather sheet was manufactured in the same manner as in Example 1, except that DIDP was used as a plasticizer being a component of the composition for the foaming layer or the composition for the surface layer.

Comparative Example 2

A composition for a foaming layer was manufactured in the same manner as in Example 1, except that a weight ratio of DINA and DIDP was 1:20 using DINA of 4 kg and DPHP of 80 kg.

A composition for a surface layer was manufactured in the same manner as in Example 1, except that a weight ratio of DINA and DIDP was 1:20 using DINA of 4 kg and DPHP of 80 kg.

As mentioned above, a PVC foaming artificial leather sheet was manufactured in the same manner as in Example 1, except that DINA and DPHP being a component of the composition for the foaming layer and the composition for the surface layer had different ratio.

Comparative Example 3

A composition for a foaming layer was manufactured in the same manner as in Example 1, except that a weight ratio of DINA and DIDP was 1:0.8 using DINA of 46.67 kg and DPHP of 37.33 kg.

A composition for a surface layer was manufactured in the same manner as in Example 1, except that a weight ratio of DINA and DIDP was 1:0.8 using DINA of 46.67 kg and DPHP of 37.33 kg.

As mentioned above, a PVC foaming artificial leather sheet was manufactured in the same manner as in Example 1, except that DINA and DPHP being a component of the composition for the foaming layer and the composition for the surface layer had different ratio.

2. Measuring Property of Artificial Leather Sheet

Experimental Example 1. Cold Resistance Test

[Test Equipment]

Figure 4:
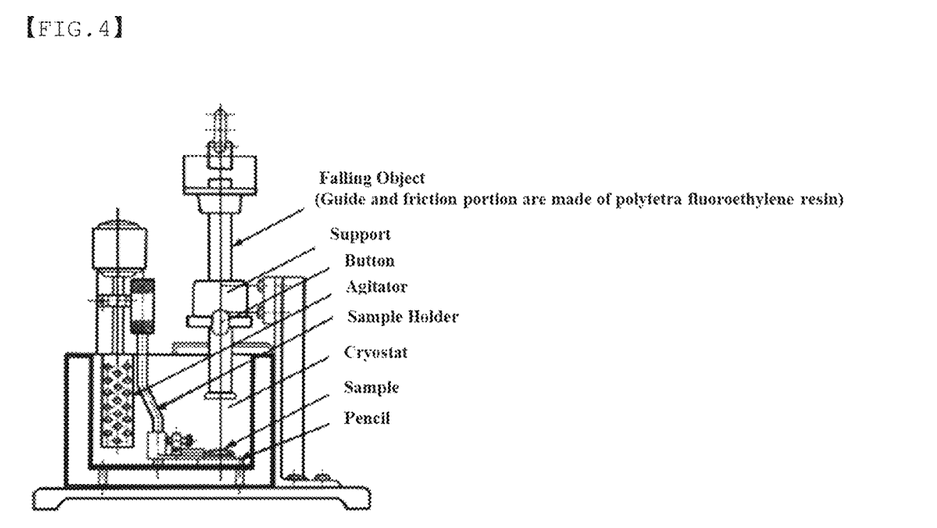
FIG. 4 is an equipment for testing cold resistance.

An equipment for testing cold resistance according to Article 10.8 of KS M 3601 was employed (FIG. 4). A temperature was controlled by using a mixture according to ISO 6353-2 or by cooling using ice block.

[Test Method]

5 samples having a width of 20 mm and a length of 100 mm were collected respectively in the length direction and the width direction. The gap between the base plate of a falling object and an anvil was 50 mm. One end of about 5 mm of the sample, which was formed by overlapping both ends of the length direction of the sample and outer surfaces of the sample, was fixed to a clamp of a jig of the sample. A support was mounted to the test equipment in order that bending portions of the sample was positioned at a center of the anvil. After 5 minutes passed, the falling object was fallen by pressing a button. After pulling the falling object immediately, the support of the sample was taken out and the sample was unhooked, and then checked whether a crazing break and a pin hole existed or not.

[Test Result]

In the above Examples 1 to 5, crazing and breaks did not happen at a temperature ranging from −40° C. to −25° C., so that it was shown that cold resistance was excellent. However, in the Comparative Example 1, crazing and breaks happened at a temperature ranging from −40° C. to −30° C. In the Comparative Examples 2 and 3, crazing and breaks happened at a temperature ranging from −40° C. to −35° C.

In this regards, O represents test OK and X represents crazing and breaks

TABLE 1

| | −25° C. | −30° C. | −35° C. | −40° C. |
|---|---|---|---|---|
| Example 1 | O | O | O | O |
| Example 2 | O | O | O | O |
| Example 3 | O | O | O | O |
| Example 4 | O | O | O | O |
| Example 5 | O | O | O | O |
| Com. Example 1 | O | X | X | X |
| Com. Example 2 | O | O | X | X |
| Com. Example 3 | O | O | X | X |

Experimental Example 2. Softness Test

Figure 5:
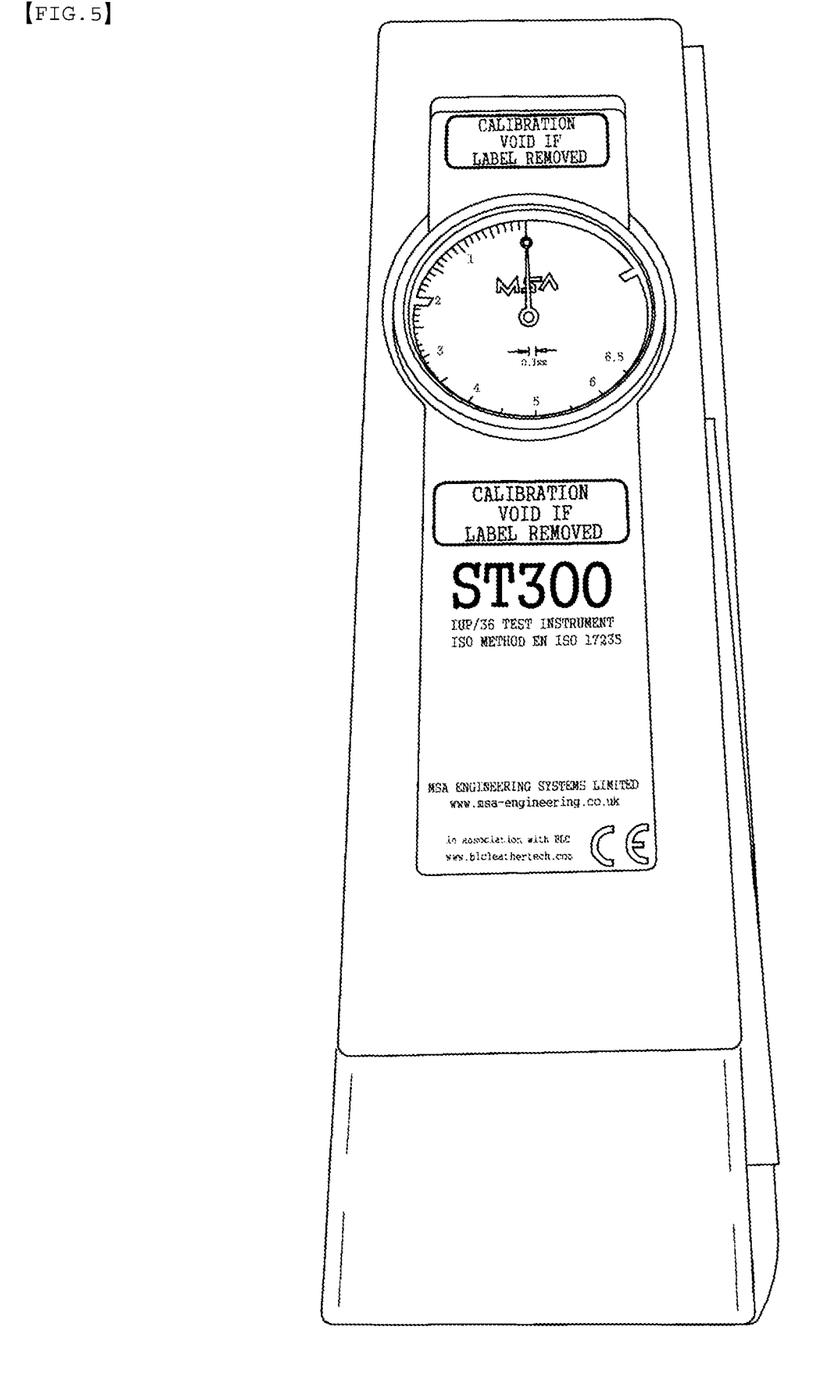
FIG. 5 is an equipment for testing softness.

[Test Equipment]
An equipment in the title of ST-300D for testing softness was employed (FIG. 5).

[Test Method]
5 samples having a diameter of 100 mm were collected and the softness of them was measured by the test equipment (15 seconds DELAY method).

The size of the test equipment was 25 cm. The softness of the sample was in proportional to the value of the test equipment.

[Test Result]
As shown in Table 2, it was shown that the softness was excellent in the Examples 1 to 5, and the softness was not good in the Comparative Examples 1 and 2.

TABLE 2

| | Softness |
|---|---|
| Example 1 | 4.4 |
| Example 2 | 4.5 |
| Example 3 | 4.6 |
| Example 4 | 4.7 |
| Example 5 | 4.8 |
| Com. Example 1 | 3.7 |
| Com. Example 2 | 3.9 |
| Com. Example 3 | 5.2 |

Experimental Example 3. Stiffness Test

Figure 6:
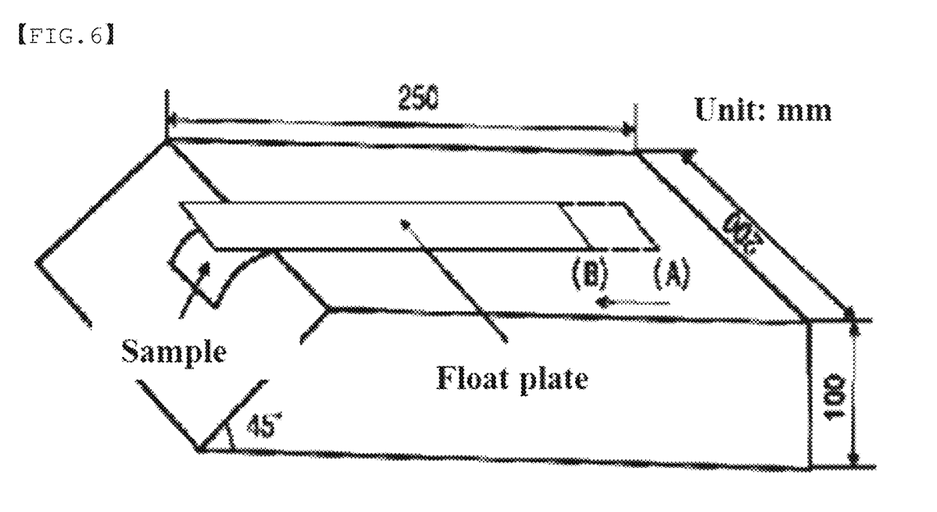
FIG. 6 is an equipment for testing stiffness.

[Test Equipment]
One of a test equipment had an inclined surface of 45° and a level was located on an upper surface of the test equipment (FIG. 6).

[Test Method]
5 samples having a width of 25 mm and a length of 200 mm were collected respectively in the length direction and the width direction. A short side on the level of the test equipment is parallel to a line (A) of SCALE. The sample was pressed by a pressing plate having the same size as the sample and became slipped at a speed of about 10 mm/sec toward the inclined surface. When one end of the sample was in contact with the inclined surface, a position of the other end (B) of the sample was read as SCALE. The stiffness was represented as a distance (gradation of B). Also, the stiffness was represented by an average value obtained by measuring surfaces and rear surfaces of the widths and lengths of five samples. The stiffness of the sample was in inverse proportional to the value of the test equipment.

[Test Result]
As shown in Table 3, it was shown that the stiffness of the sample was small in the Examples 1 to 5 and the sample was more flexible as compared with the Comparative Examples 1 and 2.

TABLE 3

| | Stiffness |
|---|---|
| Example 1 | Length: 55, Width: 71 |
| Example 2 | Length: 53, Width: 69 |
| Example 3 | Length: 50, Width: 66 |
| Example 4 | Length: 48, Width: 63 |
| Example 5 | Length: 46, Width: 62 |
| Com. Example 1 | Length: 72, Width: 77 |
| Com. Example 2 | Length: 58, Width: 75 |
| Com. Example 3 | Length: 42, Width: 58 |

Experimental Example 4. Tensile Elongation

Figure 7:
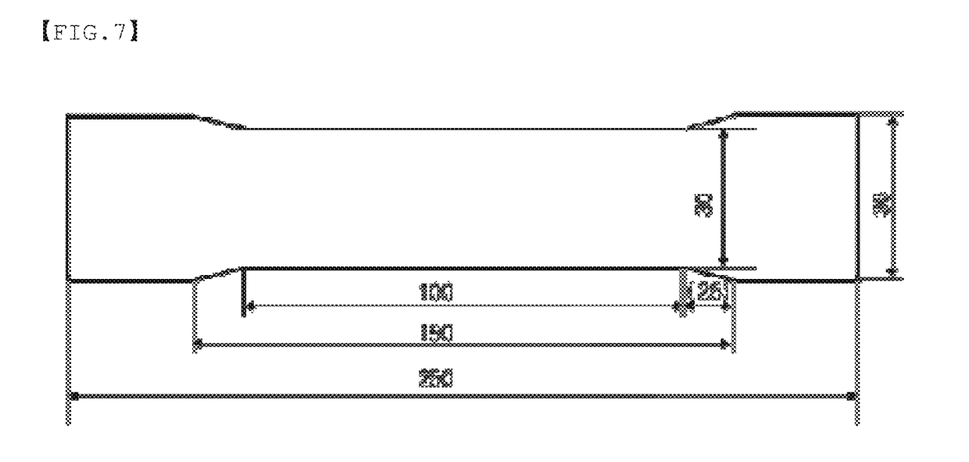
FIG. 7 is an equipment for testing tensile elongation.

[Test Equipment]
A tensile tester was used as a test equipment (FIG. 7).

[Test Method]
Five artificial leather samples were collected, and then a line of 100 mm being a gauge mark was drawn at a center of the sample. After that, when the sample was broken, a maximum weight was calculated by fixing it to the test equipment and pulling it on condition that a clamp gap was 150 mm and a tensile elongation was 200 mm/min. And, a maximum load until any of a surface skin and a backing substrate was broken was considered as a tensile strength. In addition, when the sample was broken out of the gauge mark, the measurements were not employed and a test was performed again as many as the number of the breakout. An elongation was calculated as following formula:

$$L = \frac{L_1 - L_0}{L_0}$$

wherein in the above formula, L represents elongation (%); L0 represents a gauge mark before the test; and L1 represents a gauge mark when the sample was broken after the test or a gauge mark when the surface skin or the backing substrate of the artificial leather sample was broken.

Figure 3:
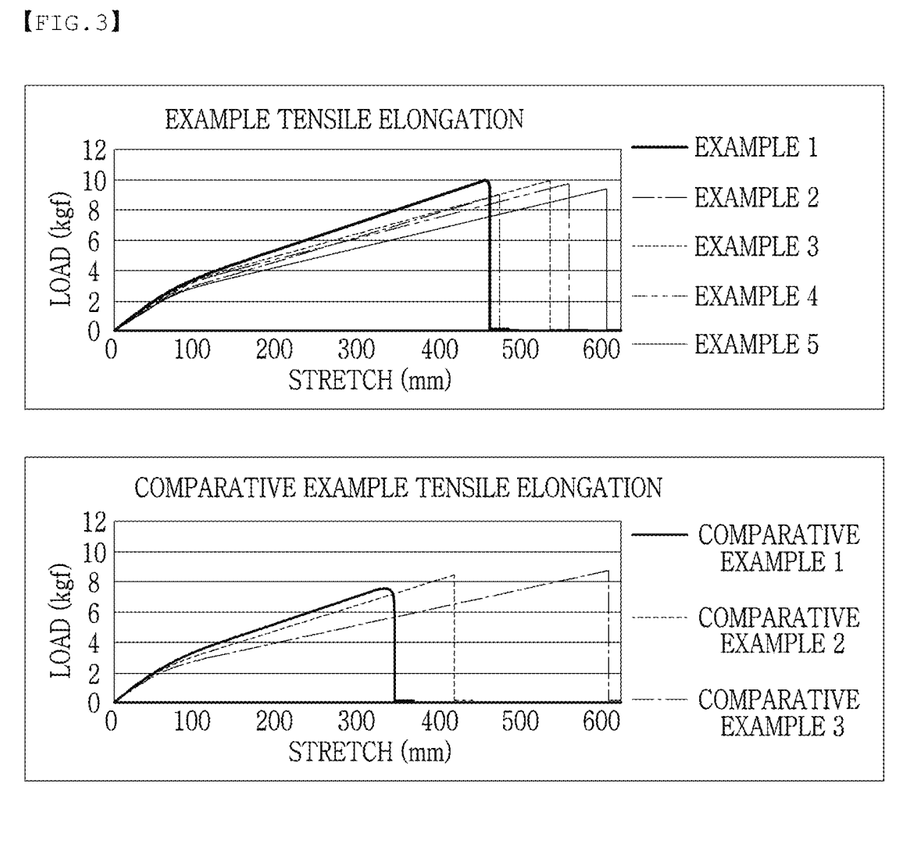
FIG. 3 is a graph showing tensile elongation of an artificial leather sheet according to an embodiment of the present invention.

[Test Result]
As shown in FIG. 3, it was shown that the tensile elongation of the sample was excellent in the Examples 1 to 5 as compared with the Comparative Examples 1 and 2.

Experimental Example 5. TVOC (Total Volatile Organic Compound) Detection Test

[Test Equipment]
A TVOC equipment having a measuring range of 0.01 ppm to 100 ppm and a resolution ranging less than 0.01 ppm was employed.

[Test Method]
The sample size of 40 mm*90 mm was tested in one sampling bag. After fully putting nitrogen in the sampling bag, the nitrogen in the sampling bag was completely discharged. This process was repeatedly performed at three times, and the nitrogen was put in two-thirds of the sampling bag and sealed. Then, the sampling bag was heated in an oven at a temperature of 65° C. for 2 hours. After 2 hours passed, the sampling bag was left at room temperature of 23±5° C. for 30 minutes. Until inner temperature was cooled to room temperature, the nitrogen was filled in order that the sampling bag was completely charged. The value was measured by connecting the TVOC equipment to the sampling bag.

[Test Result]

As a result, the content of TVOC was low in the Examples 1 to 5, and the content of TVOC was high the Comparative Examples 1 and 3.

TABLE 4

|  | TVOC |
| --- | --- |
| Example 1 | 1.1 ppm |
| Example 2 | 1.4 ppm |
| Example 3 | 1.7 ppm |
| Example 4 | 2.3 ppm |
| Example 5 | 2.8 ppm |
| Com. Example 1 | 3.4 ppm |
| Com. Example 2 | 1.0 ppm |
| Com. Example 3 | 3.2 ppm |

Experimental Example 6. Test for Detecting 15 Kinds of Controlled Phthalate-Based Plasticizer By using the artificial leather sheet of the Examples 1 to 5 and Comparative examples 1 to 3, it is confirmed that 15 kinds of controlled phthalate-based plasticizer was detected or not. The 15 kinds of controlled phthalate-based plasticizer were as the table 5. As a result, 15 kinds of controlled phthalate-based plasticizer were not detected in the Examples 1 to 5 and Comparative examples 2 and 3 (N.D represents no detection). However, it is confirmed that DIDP was not detected in the Comparative Example 1.

TABLE 5

| Item |
| --- |
| DOP (Di-2-ethylhexyl-phthalate) |
| DBP (Dibutyl phthalate) |
| BBP (Butyl Benzyl phthalate) |
| DINP (Di-isononyl phthalate) |
| DIDP (Di-isodecyl phthalate) |
| DNOP (Di-n-octyl phthalate) |
| DIBP (Di-isobutyl phthalate) |
| DEP (Di-ethyl phthalate) |
| DMP (Di-methyl phthalate) |
| DNHUP (Di-C7-11-chain alkyl phthalate) |
| DIHP (Di C6-C8 alkyl phthalate) |
| BMEP (Bis 2-methoxyethyl-phthalate) |
| DIPP (Diisopentyl phthalate) |
| DNHP (Di-n-hexyl phthalate) |
| DPP (Di phenyl phthalate) |

TABLE 6

| Item | 15 kinds of controlled phthalate |
| --- | --- |
| Example 1 | N.D |
| Example 2 | N.D |
| Example 3 | N.D |
| Example 4 | N.D |
| Example 5 | N.D |
| Com. Example 1 | DIDP detection |
| Com. Example 2 | N.D |
| Com. Example 3 | N.D |

Experimental Example 7. Test for Detecting Six Major ROHS (EU Harmful Materials)

By using the artificial leather sheet of the Examples 1 to 5 and Comparative examples 1 to 3, it is confirmed that six major ROHS harmful materials were detected or not. Six major ROHS harmful materials were as the table 7. As a result, six major ROHS harmful materials were not detected (N.D represents no detection).

TABLE 7

| Item |
| --- |
| Cadium (Cd) |
| Lead (Pb) |
| Mercury (Ag) |
| Hexavalent Chromium (Cr $^{6+}$) |
| Poly Brominated Biphenyl (PBBS) |
| Poly Brominated Diphenyl Ether(PBDES) |

TABLE 8

| Item | Six Major ROHS |
| --- | --- |
| Example 1 | N.D |
| Example 2 | N.D |
| Example 3 | N.D |
| Example 4 | N.D |
| Example 5 | N.D |
| Com. Example 1 | N.D |
| Com. Example 2 | N.D |
| Com. Example 3 | N.D |

Experimental Example 8. Test for Detecting 173 Kinds of SVHC (REACH)

By using the artificial leather sheet of the Examples 1 to 5 and Comparative examples 1 to 3, it is confirmed that 173 kinds of SVHC were detected or not. The 173 kinds of SVHC were as the table 9. As a result, the 173 kinds of SVHC were not detected (N.D represents no detection) excepting the Comparative Example 1.

TABLE 9

| No. | Item |
| --- | --- |
| 1 | Alkanes, C10-13, chloro |
| 2 | Anthracene |

TABLE 9-continued

| No. | Item |
|---|---|
| 3 | Benzyl butyl phthalate (BBP) |
| 4 | Bis(2-ethylhexyl)phthalate (DEHP) |
| 5 | Bis(tributyltin)oxide |
| 6 | Cobalt dichloride |
| 7 | 4,4-Diaminodiphenylmethane |
| 8 | Diarsenic pentaoxide* |
| 9 | Diarsenic trioxide* |
| 10 | Dibutyl phthalate (DBP) |
| 11 | Hexabromocyclododecane (HBCDD) and all major diastereoisomers identified (α-HBCDD, α-HBCDD, γ-HBCDD) |
| 12 | Lead hydrogen arsenate* |
| 13 | Sodium dichromate* |
| 14 | 5-tert-butyl-2,4,6-trinitro-m-xylene |
| 15 | Triethyl arsenate |
| 16 | Di-isobutyl phthalate(DIBP) |
| 17 | 2,4-Dinitrotoluene |
| 18 | Tris(2-chloroethyl) phosphate |
| 19 | Anthracene oil |
| 20 | Anthracene oil, anthracene paste; distn. Lights |
| 21 | Anthracene oil, anthracene paste, anthracene fraction |
| 22 | Anthracene oil, anthracene-low |
| 23 | Anthracene oil, anthracene paste |
| 24 | Coal tar pitch, high temperature |
| 25 | Lead sulfochromate yellow |
| 26 | Lead chromate molybdate sulfate red |
| 27 | Lead chromate |
| 28 | Acrylamide |
| 29 | Boric acid |
| 30 | Disodium tetraborate, anhydrous |
| 31 | Tetraboron disodium heptaoxide, hydrate |
| 32 | Trichloroethylene |
| 33 | Sodium chromate |
| 34 | Ammonium dichromate |
| 35 | Potassium dichromate |
| 36 | Potassium chromate |
| 37 | Cobalt(II) sulphate |
| 38 | Cobalt(II) dinitrate |
| 39 | Cobalt(II) carbonate |
| 40 | Cobalt(II) diacetate |
| 41 | 2-Methoxyethanol |
| 42 | 2-Ethoxyethanol |
| 43 | Chromium trioxide |
| 44 | Acids generated from chromium trioxide and their oligomers: Chromic acid Dichromic acid Oligomers of chromic acid and dichromic acid |
| 45 | 1-methyl-2-pyrrolidone |
| 46 | 2-ethoxyethyl acetate |
| 47 | 1,2-benzenedicarboxylic acid, di-C6-8-branced alkyl esters, C7-rich |
| 48 | 1,2-benzenedicarboxylic acid, di-C7-11-branched and linear alkyl esters |
| 49 | 1,2,3-trichloropropane |
| 50 | Hydrazine |
| 51 | Strontium chromate |
| 52 | 1,2-Dichloroethane |
| 53 | 2,2'-dichloro-4,4'-methylenedianiline |
| 54 | 2-Methoxyaniline o-Anisidine |
| 55 | 4-(1,1,3,3-tetramethylbutyl) phenol, (4-tert-Octylphenol) |
| 56 | Aluminosilicate Refractory Ceramic Fibres (RCF) |
| 57 | Arsenic acid |
| 58 | Bis(2-methoxyethyl) ether |
| 59 | Bis(2-methoxyethyl) phthalate |
| 60 | Calcium arsenate |
| 61 | Dichromium tris(chromate) |
| 62 | Formaldehyde, oligomeric reaction products with aniline (technical MDA) |
| 63 | Lead diazide |
| 64 | Lead dipicrate |
| 65 | Lead styphnate |
| 66 | N,N-dimethylacetamide (DMAC) |
| 67 | Pentazinc chromate octahydroxide |
| 68 | Phenolphthalein |
| 69 | Potassium hydroxyocta-oxodizincatedichromate |
| 70 | Trilead diarsenate |
| 71 | Zirconia Aluminosilicate Refractory Ceramic Fibres (Zr-RCF) |
| 72 | 1,2-bis(2-methoxyethoxy) ethane (TEGDME; triglyme) |
| 73 | 1,2-dimethoxyethane; ethylene glycol dimethyl ether (EGDME) |
| 74 | Diboron trioxide |
| 75 | Formamide |
| 76 | Lead(II) bis(methanesulfonate) |
| 77 | TGIC(1,3,5-tris (oxiranyl methyl)-1,3,5-triazine-2,4,6(1H,3H,5H)-trione) |
| 78 | β-TGIC (1,3,5-tris[(2S and 2R)-2,3-epoxypropyl]-1,3,5-triazine-2,4,6-(1H,3H,5H)-trione)** |
| 79 | 4,4'-bis(dimethylamino) benzophenone (Michler's ketone) |
| 80 | N,N,N',N'-tetramethyl-4,4'-methylenedianiline (Michler's base) |
| 81 | [4-[4,4'-bis(dimethylamino) benzhydrylidene]cyclohexa-2,5-dien-1-ylidene] dimethylammonium chloride (C.I. Basic Violet 3) |
| 82 | [4-[[4-anilino-1-naphthyl][4-(dimethylamino)phenyl]methylene]cyclohexa-2,5-dien-1-ylidene] dimethylammonium chloride (C.I. Basic Blue 26) |
| 83 | α,α-Bis[4-(dimethylamino) phenyl]-4 (phenylamino) naphthalene-1-methanol (C.I. Solvent Blue 4) |
| 84 | 4,4'-bis(dimethylamino)-4"-(methylamino)trityl alcohol |
| 85 | Bis(pentabromophenyl) ether (DecaBDE) |
| 86 | Pentacosafluorotridecanoic acid |
| 87 | Tricosafluorododecanoic acid |
| 88 | Henicosafluoroundecanoic acid |
| 89 | Heptacosafluorotetradecanoic acid |
| 90 | 4-(1,1,3,3-tetramethylbutyl) phenol, ethoxylated—covering well-defined substances and UVCB substances, polymers and homologues |
| 91 | 4-Nonylphenol, branched and linear—substances with a linear and/or branched alkyl chain with a carbon number of 9 covalently bound in position 4 to phenol, covering also UVCB- and well-defined substances which include any of the individual isomers or a combination thereof |
| 92 | Diazene-1,2-dicarboxamide (C,C'-azodi(formamide) |
| 93 | Cyclohexane-1,2-dicarboxylic anhydride (Hexahydrophthalic anhydride—HHPA) |
| 94 | Hexahydromethylphathalic anhydride, Hexahydro-4-methylphathalic anhydride, Hexahydro-l-methylphathalic anhydride, Hexahydro-3-methylphathalic anhydride |
| 95 | Methoxy acetic acid |
| 96 | 1,2-Benzenedicarboxylic acid, dipentylester, branched and linear |
| 97 | Diisopentylphthalate (DIPP) |
| 98 | N-pentyl-isopentylphtalate |
| 99 | 1,2-Diethoxyethane |
| 100 | N,N-dimethylformamide; dimethyl formamide |
| 101 | Dibutyltin dichloride (DBT) |
| 102 | Acetic acid, lead salt, basic |
| 103 | Basic lead carbonate (trilead bis(carbonate)dihydroxide) |

TABLE 9-continued

| No. | Item |
|---|---|
| 104 | Lead oxide sulfate (basic lead sulfate) |
| 105 | [Phthalato(2-)]dioxotrilead (dibasic lead phthalate) |
| 106 | Dioxobis(stearato)trilead |
| 107 | Fatty acids, C16-18, lead salts |
| 108 | Lead bis(tetrafluoroborate) |
| 109 | Lead cyanamidate |
| 110 | Lead dinitrate |
| 111 | Lead oxide (lead monoxide) |
| 112 | Lead tetroxide (orange lead) |
| 113 | Lead titanium trioxide |
| 114 | Lead Titanium Zirconium Oxide* |
| 115 | Pentalead tetraoxide sulphate |
| 116 | Pyrochlore, antimony lead yellow |
| 117 | Silicic acid, barium salt, lead-doped |
| 118 | Silicic acid, lead salt |
| 119 | Sulfurous acid, lead salt, dibasic |
| 120 | Tetraethyllead |
| 121 | Tetralead trioxide sulphate |
| 122 | Trilead dioxide phosphonate |
| 123 | Furan |
| 124 | Propylene oxide; 1,2-epoxypropane; methyloxirane |
| 125 | Diethyl sulphate |
| 126 | Dimethyl sulphate |
| 127 | 3-ethyl-2-methyl-2-(3-methylbutyl)-1,3-oxazolidine |
| 128 | Dinoseb |
| 129 | 4,4'-methylenedi-o-toluidine |
| 130 | 4,4'-oxydianiline and its salts |
| 131 | 4-Aminoazobenzene; 4-Phenylazoaniline |
| 132 | 4-methyl-m-phenylenediamine (2,4-toluene-diamine) |
| 133 | 6-methoxy-m-toluidine (p-cresidine) |
| 134 | Biphenyl-4-ylamine |
| 135 | o-aminoazotoluene |
| 136 | o-Toluidine; 2-Aminotoluene |
| 137 | N-methylacetamide |
| 138 | 1-bromopropane; n-propyl bromide |
| 139 | Cadmium |
| 140 | Cadmium oxide |
| 141 | Dipentyl phthalate (DPP) |
| 142 | 4-Nonylphenol, branched and linear, ethoxylated [substances with a linear and/or branched alkyl chain with a carbon number of 9 covalently bound in position 4 to phenol, ethoxylated covering UVCB- and well-defined substances, polymers and homologues, which include any of the individual isomers and/or combinations thereof] |
| 143 | Ammonium pentadecafluorooctanoate (APFO) |
| 144 | Pentadecafluorooctanoic acid (PFOA) |
| 145 | Dihexyl phthalate |
| 146 | Trixylyl phosphate |
| 147 | Imidazolidine-2-thione; 2-imidazoline-2-thiol |
| 148 | Disodium 4-amino-3-[[4'-[(2,4-diaminophenyl)azo][1,1'-biphenyl]-4-yl]azo]-5-hydroxy-6-(phenylazo)naphthalene-2,7-disulphonate (C.I. Direct Black 38) |
| 149 | Disodium 3,3'-[[1,1'-biphenyl]-4,4'-diylbis(azo)]bis(4-aminonaphthalene-l-sulphonate) (C.I. Direct Red 28) |
| 150 | Cadmium sulphide |
| 151 | Lead di (acetate) |
| 152 | 1,2-Benzenedicarboxylic acid, dihexyl ester, branched and linear |
| 153 | Cadmium chloride |
| 154 | Sodium perborate*; perboric acid, sodium salt |
| 155 | Sodium peroxometaborate |
| 156 | 2-benzotriazol-2-yl-4,6-di-tert-butylphenol (UV-320) |
| 157 | 2-(2H-benzotriazol-2-yl)-4,6-ditertpentylphenol (UV-328) |
| 158 | 2-ethylhexyl 10-ethyl-4,4-dioctyl-7-oxo-8-oxa-3,5-dithia-4-stannatetradecanoate (DOTE) |
| 159 | Reaction mass of 2-ethylhexyl 10-ethyl-4,4-dioctyl-7-oxo-8-oxa-3,5-dithia-4-stannatetradecanoate and 2-ethylhexyl 10-ethyl-4-[[2-[(2-ethylhexyl)oxy]-2-oxoethyl]thio]-4-octyl-7-oxo-8-oxa-3,5-dithia-4-stannatetradecanoate (reaction mass of DOTE and MOTE) |
| 160 | Cadmium fluoride |
| 161 | Cadmium sulphate |
| 162 | 1,2-benzenedicarboxylic acid, di-C6-10-alkyl esters; 1,2-benzenedicarboxylic acid, mixed decyl and hexyl and octyl diesters with 0.3% of dihexyl phthalate (EC No. 201-559-5) |
| 163 | 5-sec-butyl-2-(2,4-dimethylcyclohex-3-en-1-yl)-5-methyl-1,3-dioxane [1], 5-sec-butyl-2-(4,6-dimethylcyclohex-3-en-1-yl)-5-methyl-1,3-dioxane [2] [covering any of the individual isomers of [1] and [2] or any combination thereof] |
| 164 | 1,3-propanesultone |
| 165 | 2,4-di-tert-butyl-6-(5-chlorobenzotriazol-2-yl)phenol (UV-327) |
| 166 | 2-(2H-benzotriazol-2-yl)-4-(tert-butyl)-6-(sec-butyl)phenol (UV-350) |
| 167 | Nitrobenzene |
| 168 | Perflurononan-1-oic acid (2,2,3,3,4,4,5,5,6,6,7,7,8,8,9,9,9-heptadecafluorononanoic acid and its sodium and ammonium salts |
| 169 | Benzo[def]chrysene (Benzo[a]pyrene) |
| 170 | 4,4'-isopropylidenediphenol (bisphenol A) |
| 171 | 4-Heptylphenol, branched and linear [substances with a linear and/or branched alkyl chain with a carbon number of 7 covalently bound predominantly in position 4 to phenol, covering also UVCB- and well-defined substances which include any of the individual isomers or a combination thereof] |
| 172 | Nonadecafluorodecanoic acid (PFDA) and its sodium and ammonium salts |
| 173 | p-(1,1-dimethylpropyl)phenol |

TABLE 10

| Item | 173 kinds of SVHC |
|---|---|
| Example 1 | N.D |
| Example 2 | 73 N.D |
| Example 3 | N.D |
| Example 4 | N.D |
| Example 5 | N.D |
| Com. Example 1 | DIDP detection |
| Com. Example 2 | N.D |
| Com. Example 3 | N.D |

The invention claimed is:

1. An artificial leather sheet comprising:
a substrate layer;
a foaming layer formed on upper surfaces of the substrate layer;
a surface layer formed on upper surfaces of the foaming layer; and
a surface treatment layer formed on upper surfaces of the surface layer, wherein the foaming layer comprises a polyvinyl chloride resin, a plasticizer, a foaming agent, and a stabilizer, and wherein the surface layer comprises the polyvinyl chloride resin, the plasticizer, and the stabilizer, and wherein the plasticizer is bis-(2-propylheptyl) phthalate (DPHP) and di-isononyl adipate (DINA), and wherein the weight ratio of the DINA and DPHP is 1:1 to 1:19, and wherein the foaming layer includes 70 parts by weight to 95 parts by weight of the plasticizer, 0.5 parts by weight to 2.5 part by weight of the foaming agent, and 1 parts by weight to 5 parts by weight of the stabilizer with respect to 100 parts by weight of the polyvinyl chloride resin, and wherein the surface layer includes 70 parts by weight to 95 parts by weight of the plasticizer and 1 part by weight to 7 parts by weight of the stabilizer with respect to 100 parts by weight of the polyvinyl chloride resin, and wherein each of the foaming layer and the surface layer has a thickness in a range from 0.1 mm to 0.5 mm.

2. The artificial leather sheet of claim 1, wherein the foaming layer includes a processing aid, a flame retardant, or a pigment.

3. The artificial leather sheet of claim 1, wherein the surface layer includes a processing aid, an UV absorber, a flame retardant, or a pigment.

4. The artificial leather sheet of claim 1, wherein the substrate layer includes at least one or more from the group consisting of a cotton yarn, a rayon yarn, and a polyester yarn and the surface treatment layer includes an urethane-based resin or an acrylic-based resin.

5. A method for manufacturing an artificial leather sheet comprises:
forming a substrate layer;
laminating a film for a foaming layer for forming the foaming layer on upper surfaces of the substrate layer;
laminating a film for a surface layer on upper surfaces of the film for the foaming layer to form the surface layer; and
coating a composition for a surface treatment layer on upper surfaces of the surface layer to form a plurality of the surface treatment layer,
wherein the film for the foaming layer comprises a polyvinyl chloride resin, a plasticizer, a foaming agent, and a stabilizer, and
wherein the film for the surface layer comprises the polyvinyl chloride resin, the plasticizer, and the stabilizer, and
wherein the plasticizer is bis-(2-propylheptyl) phthalate (DPHP) and di-isononyl adipate (DINA) wherein the weight ratio of the DINA and DPHP is 1:1 to 1:19, and wherein the foaming layer includes 70 parts by weight to 95 parts by weight of the plasticizer, 0.5 parts by weight to 2.5 parts by weight of the foaming agent, and 1 parts by weight to 5 parts by weight of the stabilizer with respect to 100 parts by weight of the polyvinyl chloride resin, and wherein the surface layer includes 70 parts by weight to 95 parts by weight of the plasticizer and 1 part by weight to 7 parts by weight of the stabilizer with respect to 100 parts by weight of the polyvinyl chloride resin.

6. The method of claim 5, wherein the surface treatment layer includes a first surface treatment layer formed using the composition for the surface treatment layer including an acrylic-based resin or a urethane-based resin by a gravure printing.

7. The method of claim 6, further comprising:
foaming a multilayer body where the substrate layer, the film for the foaming layer, the surface layer, and the first surface treatment layer are sequentially stacked at a temperature ranging from 170° C. to 250° C. for 60 to 180 seconds to form the foaming layer;
forming an embossed pattern after forming the foaming layer; and
forming a second surface treatment layer using a composition for the surface treatment layer including the acrylic-based resin or the urethane-based resin by the gravure printing.

8. The method of claim 7, wherein the foaming layer has a thickness ranging from 0.1 mm to 0.5 mm.

9. A method for manufacturing an artificial leather sheet comprises:
forming a substrate layer;
laminating a film for a foaming layer for forming the foaming layer on upper surfaces of the substrate layer;
laminating a film for a surface layer on upper surfaces of the film for the foaming layer to form the surface layer;
forming a first surface treatment layer using a composition for the surface treatment layer including an acrylic-based resin or an urethane-based resin by a gravure printing on upper surfaces of the surface layer;
foaming a multilayer body where the substrate layer, the film for the foaming layer, the surface layer, and the first surface treatment layer are sequentially stacked at a temperature ranging from 170° C. to 250° C. for 60 to 300 seconds to form the foaming layer;
forming an embossed pattern after forming the foaming layer; and
forming a second surface treatment layer using a composition for the surface treatment layer including the acrylic-based resin or the urethane-based resin by the gravure printing,
wherein the substrate layer includes at least one or more from the group consisting of a cotton yarn, a rayon yarn, and a polyester yarn, and
wherein the film for the foaming layer includes 70 parts by weight to 95 parts by weight of the plasticizer, 0.5 parts by weight to 2.5 part by weight of the foaming agent, and 1 parts by weight to 5 parts by weight of the stabilizer with respect to 100 parts by weight of the polyvinyl chloride resin, and
wherein the film for the surface layer includes 70 parts by weight to 95 parts by weight of the plasticizer and 1 part by weight to 7 parts by weight of the stabilizer with respect to 100 parts by weight of the polyvinyl chloride resin, and
wherein the plasticizer is bis-(2-propylheptyl) phthalate (DPHP) and di-isononyl adipate (DINA), and
wherein the foaming agent is Azo Di Carbon Amide, and
wherein the weight ratio of the DINA and DPHP is 1:1 to 1:19, and
wherein the foaming layer has a thickness ranging from 0.1 mm to 0.5 mm.

\* \* \* \* \*